(12) United States Patent
Lourenco et al.

(10) Patent No.: US 12,440,802 B2
(45) Date of Patent: Oct. 14, 2025

(54) METHOD TO DRY A HYDROCARBON GAS STREAM

(71) Applicants: 1304338 Alberta Ltd., Edmonton (CA); 1304342 Alberta Ltd., Edmonton (CA)

(72) Inventors: Jose Lourenco, Edmonton (CA); Mackenzie Millar, Edmonton (CA)

(73) Assignees: 1304338 Alberta Ltd., Edmonton (CA); 1304342 Alberta Ltd., Edmonton (CA)

( * ) Notice: Subject to any disclaimer, the term of this patent is extended or adjusted under 35 U.S.C. 154(b) by 487 days.

(21) Appl. No.: 17/743,025

(22) Filed: May 12, 2022

(65) Prior Publication Data

US 2022/0370953 A1 Nov. 24, 2022

(30) Foreign Application Priority Data

May 18, 2021 (CA) ..................................... 3119011

(51) Int. Cl.
*B01D 53/26* (2006.01)
(52) U.S. Cl.
CPC ...... *B01D 53/265* (2013.01); *B01D 2256/245* (2013.01); *B01D 2257/702* (2013.01); *B01D 2257/80* (2013.01); *B01D 2258/0283* (2013.01)
(58) Field of Classification Search
CPC .......... B01D 2256/245; B01D 2257/80; B01D 2257/702; B01D 2258/0283; B01D 5/00; B01D 5/0027; B01D 5/003; B01D 5/0036; B01D 5/0039; B01D 5/0087; B01D 53/002; B01D 53/265; B01D 53/263; B01D 53/14; B01D 53/1487; F25J 3/02; F25J 3/0238; F25J 3/0252; F25J 3/0209; F25J 3/0214

USPC ....... 62/606, 617, 928; 55/342; 95/174, 183, 95/192, 194, 205, 209, 227, 228, 236, 95/237, 231, 229, 172, 176, 177, 187, 95/208; 96/108, 122, 126, 130
See application file for complete search history.

(56) References Cited

U.S. PATENT DOCUMENTS

| 4,566,886 A | * | 1/1986 | Fabian | F25J 3/0223 62/619 |
| 5,321,592 A | * | 6/1994 | Marinacci | H01R 4/2433 362/640 |

(Continued)

FOREIGN PATENT DOCUMENTS

CN 1046729 A * 11/1990 ................. F25J 3/02

*Primary Examiner* — Duane Smith
(74) *Attorney, Agent, or Firm* — CHRISTENSEN O'CONNOR JOHNSON KINDNESS PLLC

(57) ABSTRACT

A method to dry a gas stream that includes methane and condensable components that have a lower boiling point than methane by: combining the gas stream with a cold liquid stream in a gas mixer to produce a mixed stream that is colder than the gas stream and to condense a first portion of the condensable components; passing the mixed stream through a first separator to remove the condensed first portion and obtain a second gas stream; lowering a pressure and temperature of the second gas stream in an expansion device to obtain a third gas stream and condense a second portion of the condensable components; passing the third gas stream through a second separator to remove the condensed second portion and obtain a dried gas stream; and recirculating at least a portion of the condensed second portion into the in-line gas mixer as the cold liquid stream.

7 Claims, 2 Drawing Sheets

(56) References Cited

U.S. PATENT DOCUMENTS

| | | | | |
|---|---|---|---|---|
| 5,788,745 A * | 8/1998 | Hahn | B01D 53/263 | 95/193 |
| 5,868,004 A * | 2/1999 | Rojey | C10G 5/04 | 62/625 |
| 5,871,563 A * | 2/1999 | Roth | B01D 53/002 | 95/228 |
| 5,942,203 A * | 8/1999 | Van Dijk | C01B 3/34 | 423/385 |
| 6,293,084 B1 * | 9/2001 | Drnevich | B01D 53/22 | 96/10 |
| 6,485,545 B1 * | 11/2002 | Ohlrogge | F04B 39/16 | 95/52 |
| 7,850,763 B2 * | 12/2010 | White | C01B 32/50 | 62/928 |
| 8,747,520 B2 * | 6/2014 | Bearden | B01D 53/002 | 95/94 |
| 8,790,452 B2 * | 7/2014 | Posa | F23J 15/04 | 95/227 |
| 8,852,318 B2 * | 10/2014 | Briglia | F25J 3/0266 | 96/155 |
| 8,900,355 B2 * | 12/2014 | White | F25J 3/0266 | 95/227 |
| 11,738,302 B1 * | 8/2023 | Bikson | B01D 53/1431 | 55/522 |
| 2009/0249829 A1 * | 10/2009 | Lourenco | F25J 3/0635 | 62/632 |
| 2010/0000255 A1 * | 1/2010 | Mak | B01D 53/14 | 62/625 |
| 2010/0139484 A1 * | 6/2010 | Li | B01D 53/62 | 95/42 |
| 2011/0203314 A1 * | 8/2011 | Mak | B01D 53/1475 | 96/242 |
| 2012/0079852 A1 * | 4/2012 | Northrop | F25J 3/0233 | 55/342 |
| 2012/0324941 A1 * | 12/2012 | Van Der Vaart | F25J 3/0238 | 62/618 |
| 2013/0152627 A1 * | 6/2013 | Lourenco | F25J 3/0209 | 62/611 |
| 2013/0333416 A1 * | 12/2013 | Lourenco | B01D 3/4211 | 62/611 |
| 2014/0332447 A1 * | 11/2014 | Bell | C10G 1/002 | 196/46 |
| 2015/0007981 A1 * | 1/2015 | Shomody | E21B 41/005 | 166/245 |
| 2015/0107297 A1 * | 4/2015 | Lourenco | F25J 1/0045 | 62/613 |
| 2015/0143842 A1 * | 5/2015 | Lourenco | F25J 3/0252 | 62/611 |
| 2015/0276307 A1 * | 10/2015 | Ohart | F25J 1/0227 | 62/613 |
| 2015/0345858 A1 * | 12/2015 | Millar | F25J 1/0201 | 62/613 |
| 2015/0376512 A1 * | 12/2015 | Lourenco | C10G 47/26 | 422/162 |
| 2016/0054055 A1 * | 2/2016 | Patel | F25J 3/0233 | 62/621 |
| 2016/0061519 A1 * | 3/2016 | Millar | F25J 1/02 | 62/612 |
| 2016/0238314 A1 * | 8/2016 | Millar | F25J 3/0233 | |
| 2016/0303505 A1 * | 10/2016 | Baek | B01D 53/1425 | |
| 2017/0191748 A1 * | 7/2017 | Van Leeuwen | C10L 1/04 | |
| 2017/0241709 A1 * | 8/2017 | Lourenco | F25J 3/0209 | |
| 2017/0304769 A1 * | 10/2017 | Bigeard | B01D 53/265 | |
| 2018/0265795 A1 * | 9/2018 | Lourenco | C10L 3/104 | |
| 2018/0320494 A1 * | 11/2018 | Millar | C09K 8/592 | |
| 2019/0040720 A1 * | 2/2019 | Lourenco | H01M 8/0668 | |
| 2019/0186831 A1 * | 6/2019 | Noureldin | F25J 3/04872 | |
| 2019/0277566 A1 * | 9/2019 | Terrien | F25J 3/0238 | |
| 2020/0165531 A1 * | 5/2020 | Millar | E21B 43/164 | |
| 2020/0370824 A1 * | 11/2020 | Mak | F25J 3/0209 | |
| 2020/0386090 A1 * | 12/2020 | Lourenco | E21B 43/34 | |
| 2020/0386475 A1 * | 12/2020 | Lourenco | F25J 3/0209 | |
| 2020/0407298 A1 * | 12/2020 | Lourenco | H01M 8/0662 | |
| 2021/0071947 A1 * | 3/2021 | Schwartz | F25J 3/0261 | |
| 2021/0095921 A1 * | 4/2021 | Mak | C10G 5/04 | |
| 2021/0116173 A1 * | 4/2021 | Chan | F25J 1/0247 | |
| 2021/0284589 A1 * | 9/2021 | Pham Duc | F25J 3/0252 | |
| 2022/0298443 A1 * | 9/2022 | Tazi | B01D 53/047 | |
| 2022/0316794 A1 * | 10/2022 | Garthe | F25J 1/0212 | |
| 2022/0370953 A1 * | 11/2022 | Lourenco | B01D 53/265 | |
| 2023/0064109 A1 * | 3/2023 | Lourenco | C10L 3/08 | |
| 2023/0347281 A1 * | 11/2023 | Santhanam | C10L 3/101 | |
| 2024/0219114 A1 * | 7/2024 | Chishti | F25J 3/0238 | |

* cited by examiner

METHOD TO DRY A HYDROCARBON GAS STREAM

FIELD

This relates to a method and apparatus to dry a gas stream before combustion from a pressurized gas pipeline supply, and in particular, a method and apparatus to cool, condense, separate and remove condensable hydrocarbon fractions.

BACKGROUND

In gaseous combustion processes it is desirable to have a dry gas stream to ensure complete combustion. In cold weather, water and heavier hydrocarbon fractions such as $C_3^+$ may condense in the fuel system and present a safety hazard in addition to incomplete combustion if it reaches a boiler or a furnace. In Canada and other countries where cold weather is prevalent for 6 to 8 months of the year, it is important to keep hydrocarbons gaseous streams from being wet. Moreover, the removal of heavier hydrocarbon fractions such as $C_3^+$ components, which have a higher heating value, changes the gas composition resulting in lower flame temperatures and hence also a reduction in $NO_x$ emissions. At present these boilers and furnaces fuel systems employ knock out pots to separate and collect the condensed liquid fractions before combustion.

SUMMARY

According to an aspect, there is provided a method of controlling the gas composition before combustion to improve complete combustion and as an added benefit reduce emissions.

According to an aspect, there is provided a method to cool a hydrocarbon gaseous stream where the gas stream is first pre-cooled, separated and passed through a gas expansion turbine or a JT valve to a furnace or boiler operating pressure. The method involves first, pre-cooling the feed gas hydrocarbon stream in a heat exchanger to condense and separate water and heavier hydrocarbon fractions, and then passing the leaner gas stream through a gas mixer to control pre-cooled gas temperature before separation of condensable hydrocarbon fractions. The separated gaseous fraction is then expanded through a gas expander to meet boiler furnace operating pressure, thus generating the cold energy required to condense the heavier gas fractions. The now leaner and colder gaseous fraction is routed to the gas feed exchanger to pre-cool the feed gas before combustion in the furnace. The condensed and recovered liquid hydrocarbon fractions are employed to control the composition of the feed gas by direct mixing in a mixer, to further cool, condense and dry the feed gas. The condensed and recovered feed gas is sent to storage for other process uses or sales.

The method may be applied to any feed gas for combustion processes that allows for easy control of fuel gas composition to any boiler, furnace, or any other combustion device.

According to another aspect, there is provided a method to dry a gas stream comprising methane and condensable components, the condensable components having a lower boiling point than methane, the method comprising the steps of: combining the gas stream with a cold liquid stream in a gas mixer to produce a mixed stream that is colder than the gas stream and to condense a first portion of the condensable components; passing the mixed stream through a first separator to remove the condensed first portion and obtain a second gas stream; lowering a pressure and temperature of the second gas stream in an expansion device to obtain a third gas stream and condense a second portion of the condensable components; passing the third gas stream through a second separator to remove the condensed second portion and obtain a dried gas stream; and recirculating at least a portion of the condensed second portion into the in-line gas mixer as the cold liquid stream.

According to other aspects, the method may comprise on or more of the following aspects: the condensable components may comprise water and heavier hydrocarbons; the heavier hydrocarbons may comprise $C_3^+$ hydrocarbons; the method may comprise the step of controlling an amount of the cold liquid stream mixed with the third gas stream in the in-line gas mixer to control the temperature of the mixed stream; the expansion device may comprise an expander that produces electricity; the method may further comprise the step of precooling the gas stream in a first flow path of a heat exchanger and warming the dried gas stream in a second flow path of the heat exchanger; the method may further comprise the step of passing the gas stream through a preliminary separator positioned downstream of the heat exchanger and upstream of the gas mixer to separate any condensed condensable components.

Although beneficial results may be obtained through the use of the method, as described above, greater efficiencies may be achieved through the use of a adding a compressor. This involves a step of compressing the feed gas stream where the gas feed pressure is lower than 50 psig.

In a variation of the method, a JT valve may be employed in lieu of a gas expander to generate the cold energy required to pre-cool, condense and separate the liquid and gaseous hydrocarbon fractions.

An advantage of this inventive method is that it may operate without external power inputs, resulting in savings in both capital and operating costs. The above described method was developed with a view to dry and collect hydrocarbon liquids from a fuel gas stream to enhance complete combustion and reduce emissions.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The method will now be described with reference to FIG. 1, and an alternative method will be presented with respect to FIG. 2. The description of application of the method is therefore, to be considered as an example.

The method is used to dry a fuel gas stream, or in other words, condense and separate condensable components prior to the fuel gas stream being used as a fuel gas. The components that are condensed may include heavier hydrocarbons, such as $C_3^+$ components that condense at about −42° C. at atmospheric temperature, or other components that are likely to be condensed in the environmental conditions at the facility that uses the gas stream as a fuel source. In considering the components that may need to be condensed and separated, it should be considered that the gas stream may be expanded to achieve a given operating pressure from the fuel gas stream pressure, such that the temperature of the expanded gas stream may be below the environmental conditions, and the pressure of the gas stream may also change the temperature at which the heavier hydrocarbons condense. As described herein, the method reduces the risk of a portion condensing prior to entering the boiler, furnace, or other combustion device.

Figure 1:
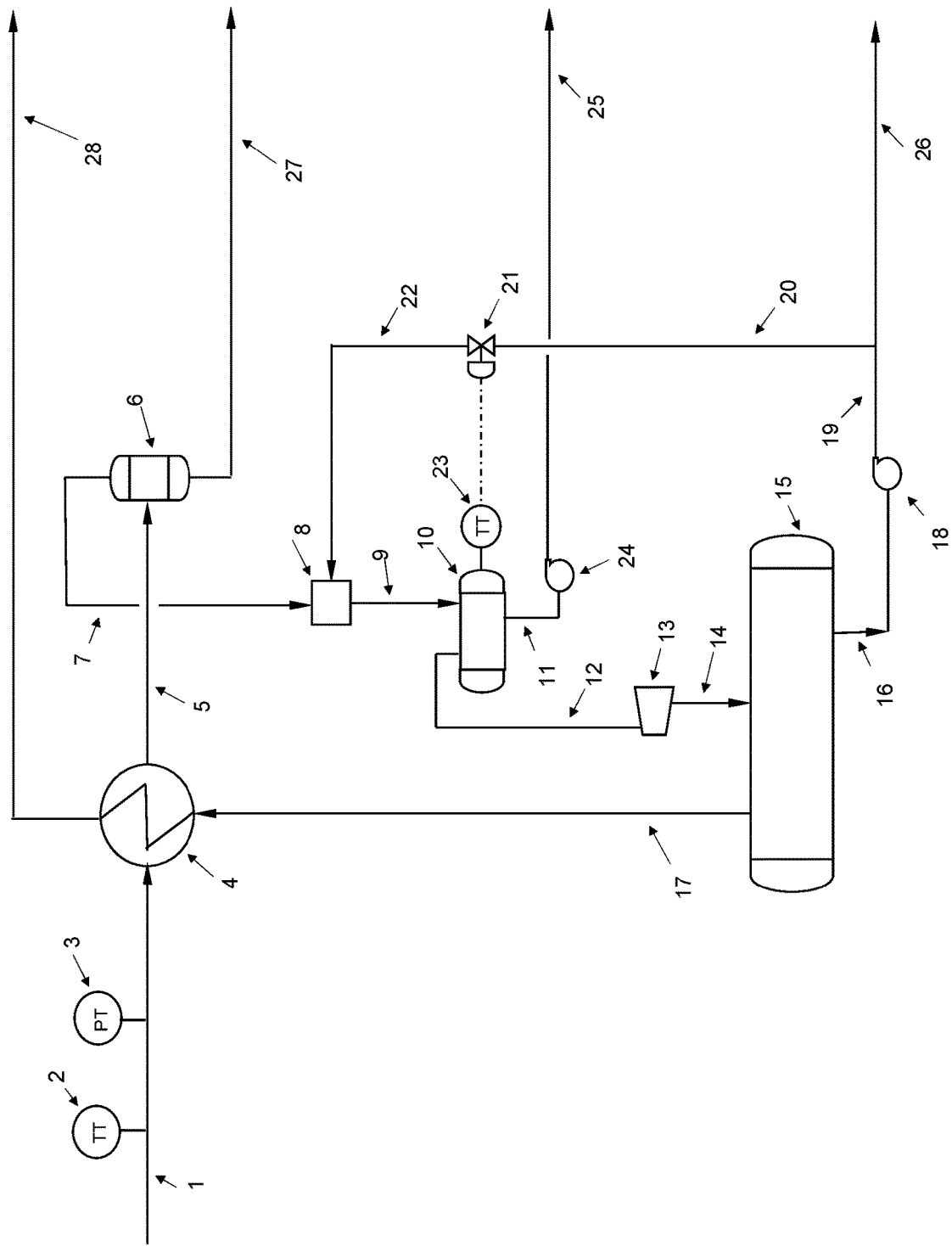
FIG. 1 is a schematic diagram of a facility equipped with a gas heat exchanger, a gas mixer, separators, and a gas expander to dry a fuel gas stream before combustion.

Referring to FIG. 1, a pressurized hydrocarbon gas stream 1 provides gas for combustion through line 1, at a temperature 2 and pressure 3, the hydrocarbon gas may be pre-cooled in heat exchanger 4 by dry gaseous stream 17. The pre-cooled hydrocarbon stream 5 enters a liquid-gas separator, referred to herein as knock out pot 6, to separate the gaseous and liquid fractions. The liquid fraction may be routed through line 27 to transport or storage. The gaseous stream 7 is routed to pre mixer 8 where a cold stream 22, discussed below, is added and mixed with stream 7 to control gas feed composition. The pre-mixed, cooler stream 9 enters separator 10 to separate the liquid and gaseous fractions. A separator temperature controller 23 may be used to control the flowrate of stream 22 by controlling valve 21. This may be done to control the temperature of mixed stream 9 and therefore the amount or quality of the hydrocarbons that are condensed and separated in separator 10. The hydrocarbons liquid stream 11 from separator 10 may be routed to storage or transport through stream 25 using pump 24. The gaseous stream 12 from separator 10 enters an expansion device, such as gas expander 13 that also produces electricity and generates more cooling by expansion of the gas, to produce cold stream 14. Cold stream 14 enters separator 15 to recover any condensed hydrocarbon liquids. The dry, gaseous stream 17 may then be warmed up in heat exchanger 4 and routed to combustion devices through line 28. Stream 17 may be heated to reach a suitable operating temperature in line 28. The hydrocarbon liquids stream 16 may be pressurized using pump 18, and the pressurized hydrocarbons liquid stream 19 from pump 18 is split into two streams, 20 and 26. Stream 20 may be routed to temperature control valve 21 to control feed gas composition as discussed above and stream 26 may be routed to storage or transport for other uses or sales. The hydrocarbons liquid stream 11 enters pump 24 and is routed to storage through stream 25.

A main feature is the simplicity of the process which eliminates the use of external refrigeration systems. In particular, the condensable components may be removed from gas stream 1 using only cold temperatures generated entirely from the process. Additionally, the process may reduce the pressure of the gas stream Another feature of the invention is the flexibility of the process to meet various operating conditions by the use of a pre-mixer to control feed gas composition. The invention also provides for an improvement on furnace emissions by removing the higher heating value hydrocarbon fractions. The proposed invention may be used in any combustion process.

Figure 2:
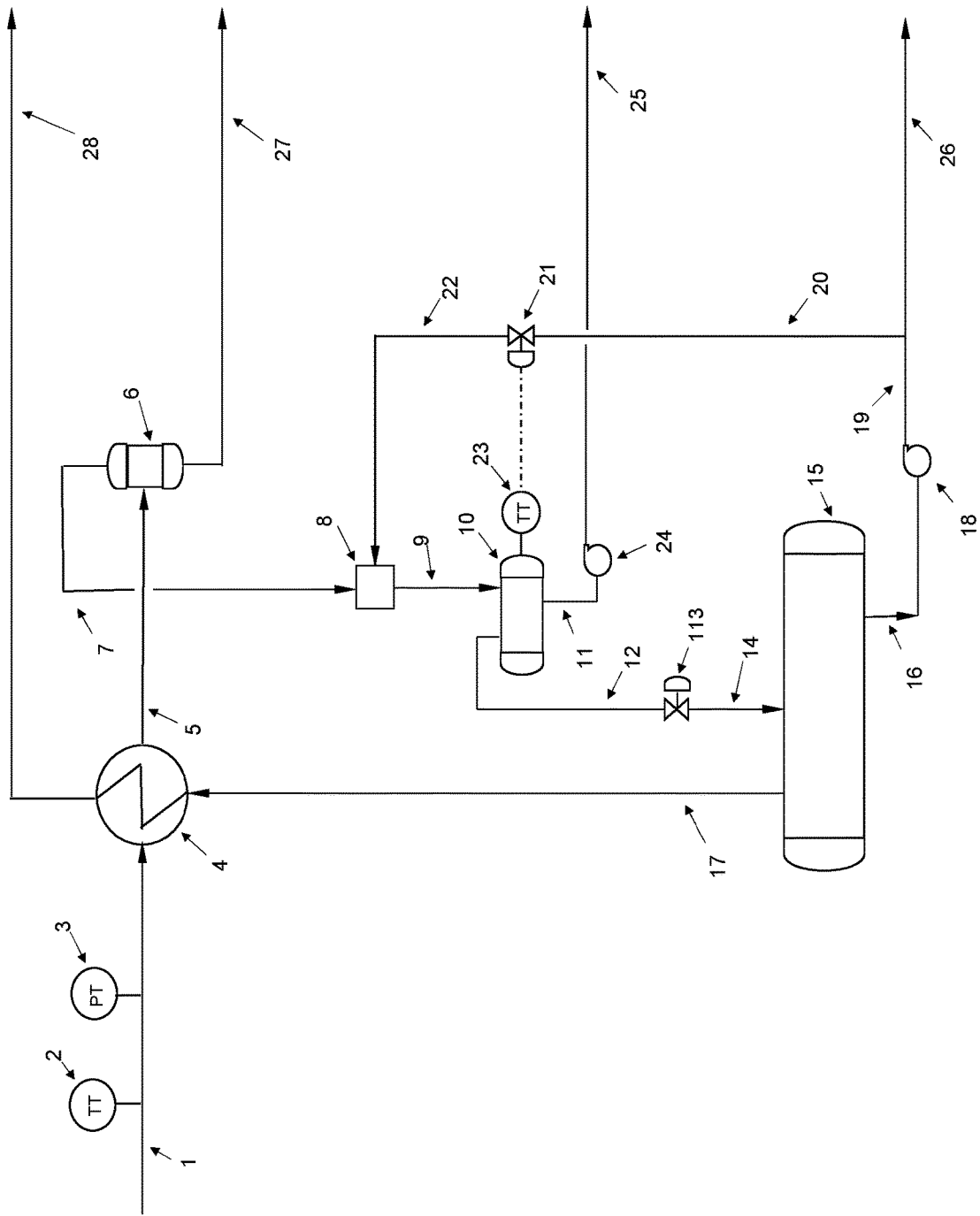
FIG. 2 is a schematic diagram of an alternative facility equipped with a JT valve in lieu of a gas expander.

Referring to FIG. 2, a similar process to FIG. 1 is shown, with gas expander 13 replaced by a JT valve 113. In the depicted example, a pressurized hydrocarbon gas stream provides gas for combustion through line 1, at a temperature 2 and pressure 3, the hydrocarbon gas is first pre-cooled in heat exchanger 4 by dry gaseous stream 17. The pre-cooled hydrocarbon stream 5 enters knock out pot 6 to separate the gaseous and liquid fractions. The liquid fraction is routed to storage through line 27. The gaseous stream 7 is routed to pre mixer 8 where a cold stream 22 is added and mixed with stream 7 to control gas feed composition. The pre-mixed, cooler stream 9 enters separator 10 to separate the liquid and gaseous fractions. A separator temperature controller 23 controls stream 22 flowrate by control valve 21. The hydrocarbons liquid stream 11 enters pump 24 and is routed to storage through stream 25. The gaseous stream 12, enters JT valve 113 to generate more cooling by expansion of the gas into stream 14, entering separator 15 for recovery of hydrocarbon liquids. The dry gaseous stream 17 is warmed up at heat exchanger 4 and routed to combustion furnaces through line 28. The hydrocarbon liquids stream 16, enters pump 18, the pressurized hydrocarbons liquid stream 19 is split into two streams, 20 and 26. Stream 20 is routed to temperature control valve 21 to control feed gas composition, and stream 26 is routed to transport or storage for other uses or sales.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given a broad purposive interpretation consistent with the description as a whole.

What is claimed is:

1. A method to dry a gas stream comprising methane and condensable components, the condensable components having a lower boiling point than methane, the method comprising the steps of:
   combining the gas stream with a cold liquid stream in an in-line gas mixer to produce a mixed stream that is colder than the gas stream and to condense a first portion of the condensable components;
   passing the mixed stream through a first separator to remove the condensed first portion and obtain a second gas stream;
   lowering a pressure and temperature of the second gas stream in an expansion device to obtain a third gas stream and condense a second portion of the condensable components;
   passing the third gas stream through a second separator to remove the condensed second portion and obtain a dried gas stream; and
   recirculating at least a portion of the condensed second portion into the in-line gas mixer as the cold liquid stream.

2. The method of claim 1, wherein the condensable components comprise water and heavier hydrocarbons.

3. The method of claim 2, wherein the heavier hydrocarbons are $C_3^+$ hydrocarbons.

4. The method of claim 1, comprising the step of controlling an amount of the cold liquid stream mixed with the gas stream in the in-line gas mixer to control the temperature of the mixed stream.

5. The method of claim 1, wherein the expansion device comprises an expander that produces electricity.

6. The method of claim 1, further comprising the step of precooling the gas stream in a first flow path of a heat exchanger and warming the dried gas stream in a second flow path of the heat exchanger.

7. The method of claim 6, further comprising the step of passing the gas stream through a preliminary separator positioned downstream of the heat exchanger and upstream of the in-line gas mixer to separate any condensed condensable components.

\* \* \* \* \*